(12) United States Patent
Cochrane et al.

(10) Patent No.: US 7,505,957 B2
(45) Date of Patent: Mar. 17, 2009

(54) INCREMENTAL AST MAINTENANCE USING WORK AREAS

(75) Inventors: Roberta J. Cochrane, Los Gatos, CA (US); Mir H. Pirahesh, San Jose, CA (US); Richard S. Sidle, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 10/643,644

(22) Filed: Aug. 19, 2003

(65) Prior Publication Data

US 2005/0044493 A1    Feb. 24, 2005

(51) Int. Cl.
*G06F 7/00* (2006.01)
*G06F 17/30* (2006.01)

(52) U.S. Cl. .................. 707/2; 707/3; 707/10; 707/100; 707/200

(58) Field of Classification Search .................. 707/200, 707/2, 3, 104.1, 201, 1, 4
See application file for complete search history.

(56) References Cited

U.S. PATENT DOCUMENTS

| | | | |
|---|---|---|---|
| 5,535,385 A * | 7/1996 | Griffin et al. | 707/3 |
| 5,983,228 A | 11/1999 | Kobayashi et al. | |
| 6,026,390 A | 2/2000 | Ross et al. | |
| 6,061,676 A * | 5/2000 | Srivastava et al. | 707/3 |
| 6,125,360 A | 9/2000 | Witkowski et al. | |
| 6,134,543 A | 10/2000 | Witkowski et al. | |
| 6,272,502 B1 | 8/2001 | Lieuwen et al. | |
| 6,275,818 B1 * | 8/2001 | Subramanian et al. | 707/2 |
| 6,460,027 B1 * | 10/2002 | Cochrane et al. | 707/2 |
| 6,484,159 B1 | 11/2002 | Mumick et al. | |
| 6,678,676 B2 * | 1/2004 | Brickell et al. | 707/3 |
| 6,763,352 B2 * | 7/2004 | Cochrane et al. | 707/4 |
| 6,847,962 B1 * | 1/2005 | Cochrane et al. | 707/4 |
| 7,080,062 B1 * | 7/2006 | Leung et al. | 707/2 |
| 2002/0046204 A1 | 4/2002 | Hayes | |
| 2002/0111955 A1 | 8/2002 | Colby et al. | |
| 2004/0128289 A1 * | 7/2004 | Cochrane et al. | 707/4 |

(Continued)

OTHER PUBLICATIONS

Escardo, Martin. "Floating Point arithmatic with error analysis" May 3, 2001. University of Edinburgh.*

(Continued)

*Primary Examiner*—Hosain T Alam
*Assistant Examiner*—Usmaan Saeed
(74) *Attorney, Agent, or Firm*—Gibb I.P. Law Firm, LLC

(57) ABSTRACT

Disclosed is a method and system for incrementally maintaining algebraic functions in automatic summary tables (ASTs) of at least one relational database. The method associates a work area with each algebraic function in each AST. Each work area is comprised of one or more variables. The method populates the variables within each work area for each algebraic function when each AST is created and when each AST is updated. The method maintains each work area by adding and subtracting to and from its associated variables when the associated data changes in the relational database. The functions that compute the variables of the work areas are distributive and thus incrementally maintainable. The method computes and recomputes the algebraic function within an AST after the updates have changed one or more of the variables of its work area.

2 Claims, 3 Drawing Sheets

U.S. PATENT DOCUMENTS

2004/0153430 A1* 8/2004 Sayad ......................... 706/61

OTHER PUBLICATIONS

Lehner et al, Maintenance of cube Automatic Summary Tables, ACM 2000, University of Erlangen Germany, pp. 512-513.*

"Incremental Maintenance for Non-Distributive Aggregate Functions", Themistoklis Palpanas, Richard Sidle, Roberta Cochrane, Hamid Pirahesh, Proceedings of the 28th VLDB Conference, Hong Kong, China, 2002, 12 pages.

"Derivation of Incremental equations for Nested Relations", Jixue Liu, Millist Vincent, Database Conference, 2001, ADC 2001, Proceedings 12th Australasian, pp. 76-82.

"Materialized View Selection and Maintenance Using Multi-Query Optimization", Hoshi Mistry, Prasan Roy, S. Sudarshan, Krithi Ramamritham, ACM SIGMOD 2001, May 21-24, Santa Barbara, California, 2001, pp. 307-318.

"Materialized View Maintenance and Integrity Constraint Checking: Trading Space for Time", ACM SIG<MOD Conference, Jun. 1996, pp. 447-458.

* cited by examiner

INCREMENTAL AST MAINTENANCE USING WORK AREAS

CROSS REFERENCE TO RELATED APPLICATIONS

The present application is related to pending U.S. patent application Ser. No. 09/453,892, filed Dec. 2, 1999 to Roberta Cochrane et al., entitled "Incremental Maintenance of Summary Tables with Complex Grouping Expressions,"; U.S. patent application Ser. No. 10/335,376 filed Dec. 30, 2002 to Roberta Cochrane et al., entitled "System and Method For Incrementally Maintaining Non-Distributive Aggregate Functions In a Relational Database,"; and Canada Patent Application No. 241 4983 filed in Canada on Dec. 23, 2003, entitled "Independent Deferred Incremental Refresh of Materialized Views". The foregoing applications are assigned to the present assignee, and are all incorporated herein by reference.

BACKGROUND OF THE INVENTION

1. Field of the Invention

The present invention generally relates to incrementally maintaining algebraic functions in automatic summary tables (ASTs) of at least one relational database.

2. Description of the Related Art

Within this application several publications are referenced by Arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

Automatic Summary Tables (ASTs), which are also known as materialized views physically, store derived data from several relational database tables. ASTs are of important usage to various applications to improve query performance [3] such as OLAP or data mining applications. However, as base tables change over time, one of the important issues of ASTs is to maintain the ASTs extent upon base changes. Since re-computation from base tables is usually expensive, incremental maintenance of ASTs is often a better solution in terms of performance [1, 6, 7].

Materialized views, or Automatic Summary Tables (ASTs), are increasingly being used to facilitate the analysis of the large amounts of data being collected in relational databases. The use of ASTs can significantly reduce the execution time of a query. This reduction in execution time is particularly significant for databases with sizes in the terabyte to petabyte range. Such queries tend to be extremely complex and can involve a large number of join and grouping operations.

One major advantage of using ASTs is that they are pre-computed once and subsequently can be used multiple times to quickly answer complex queries. When base is relations are modified, these modifications must be propagated to the affected ASTs. Unfortunately, using current techniques, the systems can only incrementally update a restricted set of ASTs, e.g., those only containing distributive aggregate functions. The remainder must be fully recomputed. Previous work has studied the problem of incremental view maintenance in which all the necessary changes for the AST are computed based only on the modifications to the base table (and the corresponding values in the AST). This process is called incremental view maintenance and many commercial products support it.

Due to the complexity of the queries and the magnitude of the data, recomputation of ASTs in large-scale databases is prohibitive. Since the set of updates to the base tables is usually only some small percentage of those tables, incremental maintenance of an AST is usually much quicker than full recomputation. For example, a typical warehouse may contain up to six (6) years of data. Daily inserts into a fact table in this warehouse may constitute only about five hundredths of a percent (0.05%) of the entire size of the table. When updates occur in the base data, the system determines which ASTs are affected and propagates the changes through the AST definitions to produce the delta changes. It then applies these deltas to their respective ASTs. If an AST is automatically refreshed in the same unit of work as the changes to the underlying base data are applied, then the maintenance is considered immediate. Otherwise, it is deferred.

SUMMARY OF THE INVENTION

The present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

The invention provides a method and system for incrementally maintaining algebraic functions in automatic summary tables (ASTs) of at least one relational database. More specifically, the invention associates a work area with each algebraic function in each AST. Each work area is comprised of one or more variables. The invention populates the variables within each work area for each algebraic function when each AST is created and when each AST is updated. The invention maintains each work area by adding and subtracting to and from its associated variables when the associated data changes in the relational database. The functions that compute the variables of the work areas are distributive and thus incrementally maintainable. The invention computes and recomputes the algebraic function within an AST after the updates have changed one or more of the variables of its work area.

In one embodiment, multiple algebraic functions may share the same work area. For example, multiple algebraic functions may share the same work areas when the work area requirements of the algebraic functions match exactly, match partially, or intersect.

Thus, with the invention, the association of a work area for each algebraic function makes the aggregate algebraic function incrementally maintainable. Also, the invention designs a framework in the query compilation phase for incremental maintenance of the algebraic functions in an AST. Also, the invention generalizes the solutions and framework to any algebraic functions, even user defined aggregates.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
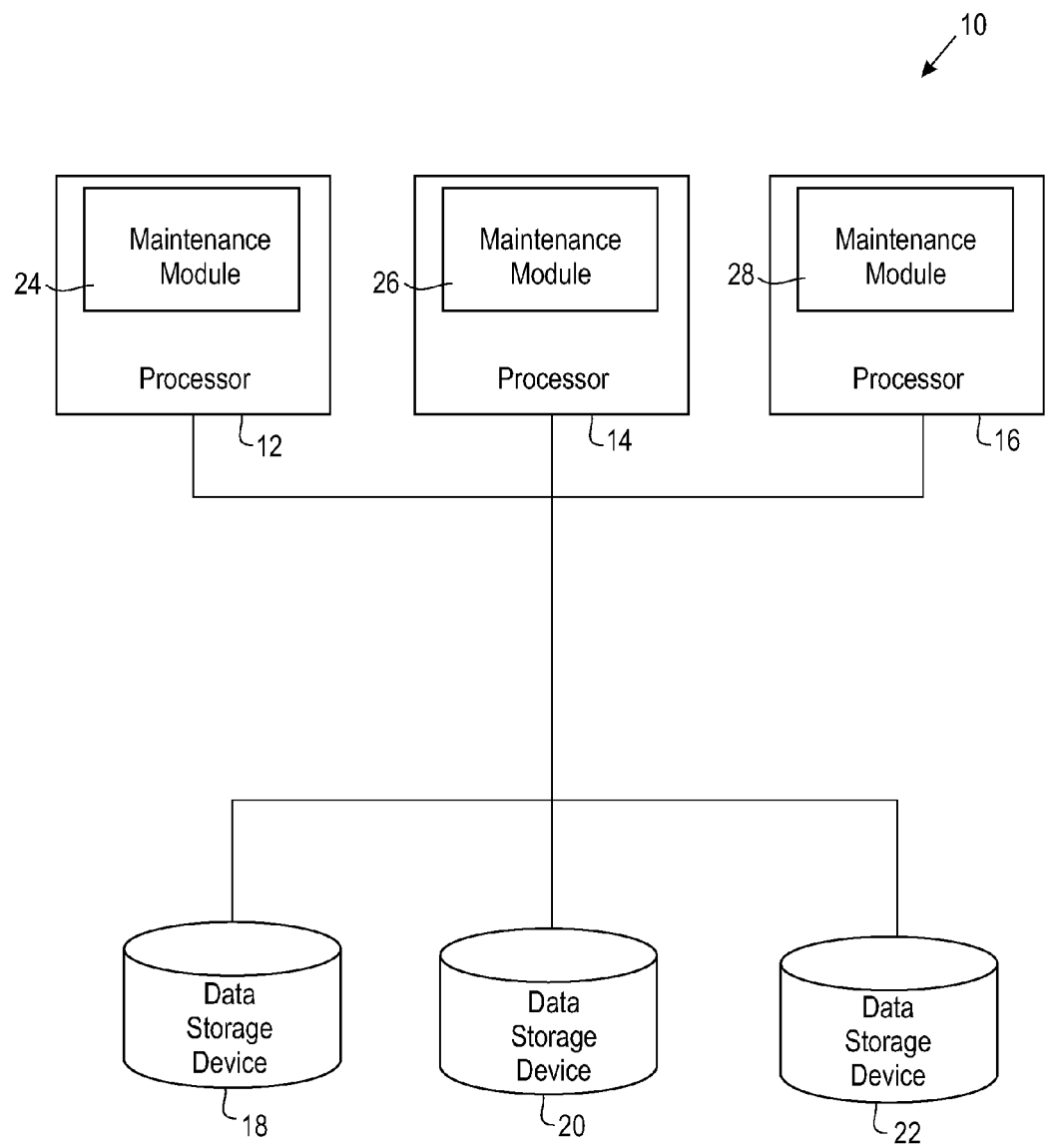
FIG. 1 is a schematic diagram of a system architecture.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention in detail.

ASTs usually contain aggregates or super aggregates. A super-aggregate is a SQL language clause that supports the computation of measures for different levels of hierarchy. There are three types of aggregate functions, namely, distributive, algebraic and holistic. Distributive functions include, for example, SUM and COUNT. The aggregate functions of this category are characterized as being incrementally maintainable. For example, given two SUMs of two datasets, the invention can compute the new SUM simply by adding these two values.

The second category of the aggregate functions is algebraic functions, such as standard deviation, variance, covariance, correlation, and regression family functions. Such aggregate functions are not directly incrementally maintainable, e.g., given two standard deviations, it is not possible to compute the new standard deviation simply based on these two values. However, by using some additional bounded space, these functions can be made incrementally maintainable.

How to maintain such aggregates introduces additional complexity [4, 6]. This application provides incremental maintenance of one type of aggregate functions, called algebraic functions, such as standard deviation, regression functions, etc. However, such algebraic functions are not directly incrementally maintainable by themselves. Instead, the invention associates some additional bounded storage space called a "work area", with each algebraic function. Now the problem of the incremental maintenance of the algebraic functions becomes the incremental maintenance of its corresponding work area. By properly defining the work area maintenance functions, the invention is able to incrementally maintain the algebraic functions.

The present invention associates a work area with algebraic functions for incremental maintenance. Shown below is a brief illustration of the techniques of the invention. Consider an AST with an average aggregate function Average(X) as shown:

SELECT C.c1, avg(C.c2), count(*) FROM C GROUP BY C.c1;

Notice that avg(C.c2) is not incrementally maintainable. Therefore, the invention adds an additional column, work area (SUM(C.c2), COUNT(C.c2)) associated with the avg (C.c2) column. Since SUM and COUNT are incrementally maintainable, computing the new average simply by dividing the maintained work area SUM by work area COUNT is the preferred direction.

Thus, with the invention, the association of a work area for each algebraic function makes the aggregate algebraic function incrementally maintainable. Also, the invention designs a framework in the query compilation phase for incremental maintenance of the algebraic functions in AST. Also, the invention generalizes the solutions and framework to any algebraic functions, even user defined aggregates.

Specific embodiments of the invention will now be further described by the following nonlimiting examples, which will serve to illustrate in some detail, various features of significance. The examples are intended merely to facilitate an understanding of ways in which the invention may be practiced and to further enable those of skill in the art to practice the invention. Accordingly, the examples should not be construed as limiting the scope of the invention.

Referring now to the drawings, there are shown preferred embodiments of the method and structures according to the present invention. Referring initially to FIG. 1, the system architecture is shown and is generally designated 10. FIG. 1 shows that the system 10 includes one or more processors 12, 14, 16 that are connected to one or more data storage devices 18, 20, 22, such as disk drives, in which one or more relational databases are stored. In a preferred embodiment, each processor 12, 14, 16 includes a maintenance module 24, 26, 28 for incrementally maintaining materialized views of the relational databases stored in the storage devices 18,20,22.

Preferably, each of the processors 12, 14, 16 utilize a standard operator interface, e.g., IMS/DB/DC, CICS, TSO, OS/2 or other similar interface, to transmit electrical signals to and from the processors 12, 14, 16. The electrical signals represent commands for performing various search and retrieval functions, i.e., termed queries, against the databases stored in the data storage devices 18, 20, 22. Preferably, these queries conform to the Structured Query Language (SQL) standard, and invoke functions performed by Relational Database Management System (RDBMS) software. In a preferred embodiment, the RDBMS software comprises the DB2 product offered by IBM for the MVS, OS/2, UNIX, or WINDOWS NT operating systems. Those skilled in the art will recognize, however, that the present invention has application to any RDBMS software.

It is to be understood that, in a preferred embodiment, each processor 12, 14, 16 includes a series of computer-executable instructions, as described below, which will allow each processor to provide incremental maintenance for materialized views in the relational databases residing on the data storage devices 18, 20, 22. These instructions may reside, for example, in the maintenance modules 24, 26, 28 of the processors 12, 14, 16, which can simply be a portion of the random access memory (RAM) of the processors 12, 14, 16.

Alternatively, the instructions may be contained on a data storage device with a computer readable medium, such as a computer diskette. Or, the instructions may be stored on a magnetic tape, hard disk drive, electronic read-only memory (ROM), optical storage device, or other appropriate data storage device or transmitting device thereby making a computer program product, i.e., an article of manufacture according to the invention. In an illustrative embodiment of the invention, the computer-executable instructions may be lines of C++ compatible code.

The flow charts herein illustrate the structure of the logic of the present invention as embodied in computer program software. Those skilled in the art will appreciate that the flow charts illustrate the structures of computer program code elements including logic circuits on an integrated circuit that function according to this invention. Manifestly, the invention is practiced in its essential embodiment by a machine component that renders the program elements in a form that instructs a digital processing apparatus (that is, a computer) to perform a sequence of function steps corresponding to those shown.

Figure 2:
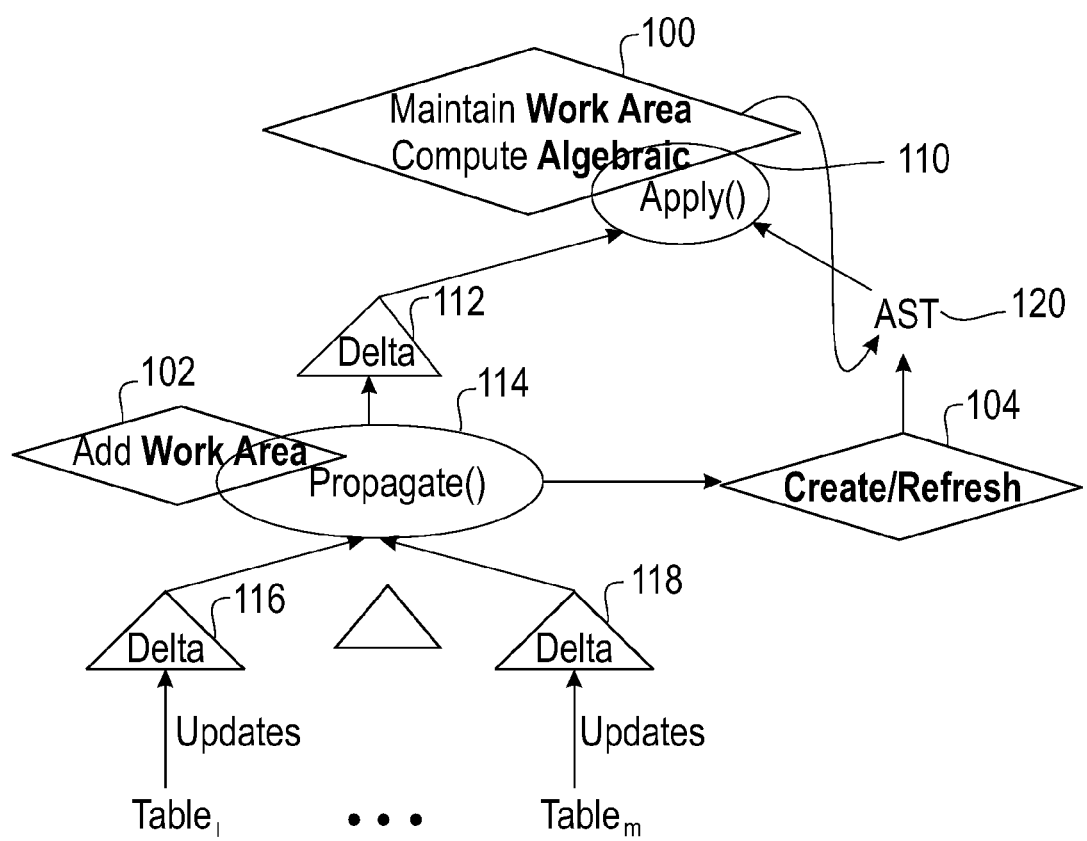
FIG. 2 is a schematic diagram of a framework for incremental maintenance of algebraic functions in AST.

FIG. 2 presents the referenced framework for incremental maintenance of algebraic functions in AST. As shown in FIG. 2, basically, AST maintenance is broken into two compilation phases, namely, propagation phase 114 and apply phase 110. At execution time the results of the propagation phase 114 of compilation computes the combined delta effects 112 of base updates 116, 118. The execution time results of the apply phase 100 of compilation integrates such delta effects 112 into the AST 120.

The shaded modules 100, 102, 104 in FIG. 2 show the extension of the framework for maintaining algebraic function. First, during the propagation phase 114, the invention creates a corresponding work area 102 as a column for each algebraic function. Second, these work areas will be added and populated when the AST 120 is created 104 and when the AST is refreshed 104. Third, during the apply phase 110, the work area 120 is maintained by the maintenance functions specific to the work area 100. The algebraic function is then in turn computed from the work area 100.

Figure 3:
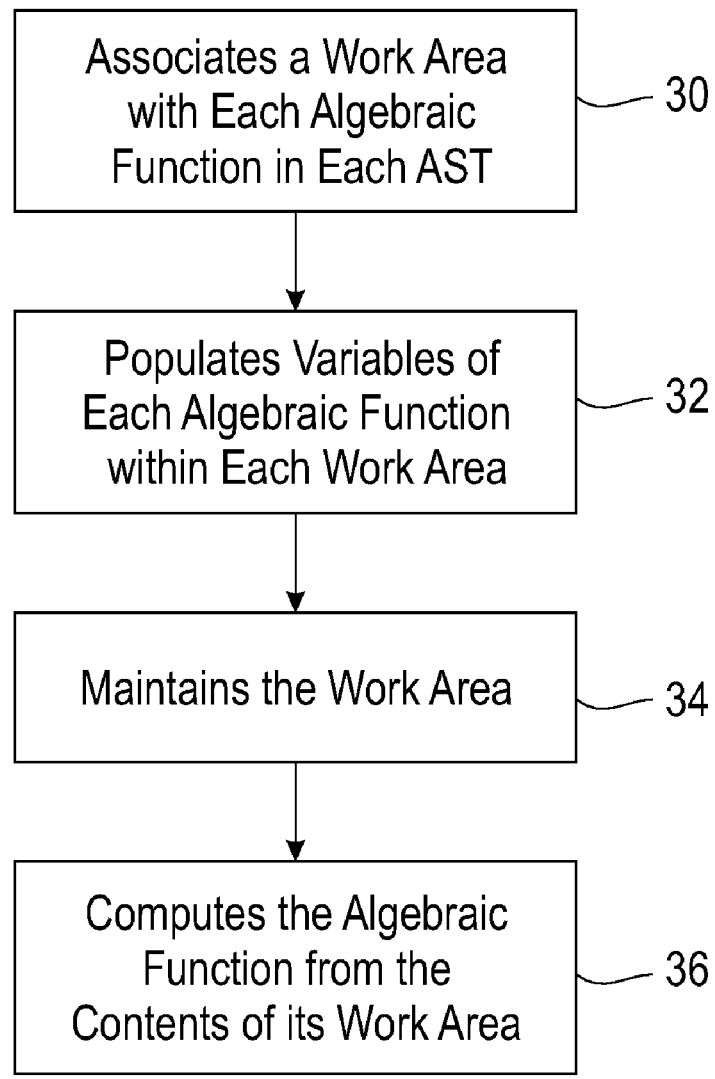
FIG. 3 is a flow diagram illustrating a preferred method of the invention.

In addition, FIG. 3 is a flowchart illustrating the processing achieved with the invention. More specifically, the invention associates a work area with each algebraic function in each AST 30 and then populates variables of each algebraic function within each work area 32 when each AST is created and when each AST is updated. The invention maintains each work area 34 by adding and subtracting to and from its associated variables when the associated data changes in the relational database. The functions that compute the variables of the work areas are distributive and thus incrementally maintainable. The invention computes and recomputes the algebraic function 36 within an AST after the updates have changed one or more of the variables of its workarea.

As previously mentioned, to maintain the algebraic function, the invention first maintains its corresponding work area and then computes the algebraic function from the new work area. Following is the description of those maintenance functions in detail and their properties.

To maintain the work area, three basic maintenance functions are used: recompute, plus and minus. In one example, these functions are defined is as follows. For recompute: WA=Recomp(S). Therefore, the invention recomputes the work area (WA) given a dataset S. Plus is given two datasets $S_1$ and $S_2$ and their corresponding work areas $WA_{S1}$ and $WA_{S2}$, i.e., $WA_{S1 \cup S2}$=Plus($WA_{S1}$, $WA_{S2}$). Minus is given two datasets $S_1$ and $S_2$, $S_1 \supseteq S_2$, and their corresponding work areas $WA_{S1}$ and $WA_{S2}$. For example, the invention can avoid recomputing the work area $WA_{S1-S2}$ by introducing a new function Minus on $WA_{S1}$ and $WA_{S2}$, i.e., $WA_{S1-S2}$=Minus($WA_{S1}$, $WA_{S2}$).

For example, average's work area is (SUM, COUNT):

Plus(($SUM_1$,$COUNT_1$),($SUM_2$,$COUNT_2$))=($SUM_1$+$SUM_2$,$COUNT_1$+$COUNT_2$)

and

Minus(($SUM_1$,$COUNT_1$),($SUM_2$,$COUNT_2$))=($SUM_1$−$SUM_2$,$COUNT_1$−$COUNT_2$).

Plus is used for inserts while minus is used for deletes. Note that the plus function can be used for the parallel computation of a work area to combine the work areas from different data partitions. Given an update to the database that involves both inserts and deletes to the base data, the new value of the work area in the AST $WA^{AST}$ is computed from the work area of the inserts $WA^{Insert}$ and the work area of the deletes $WA^{Delete}$ by the following formula:

Minus((Plus($WA^{AST}$,$WA^{Insert}$),$WA^{Delete}$)

Finally, the algebraic function is computed from the work area that has been maintained. For example, AVG is computed from its work area (SUM, COUNT) by SUM/COUNT.

Although theoretically incremental maintenance of algebraic functions using the Recomp, Plus, and Minus functions should provide the same results as full recomputation but due to inherent floating point number computation errors, different results may occur. First, the maintained algebraic results may be different from the results after recomputation and these differences may compound over time as multiple changes are made to the base tables and these changes are propagated to the AST. This may not be desirable for some applications. Second, erroneous results may occur around the boundaries. For example, the variance may result in a very small negative number instead of zero due to some floating point computation errors. This is obviously unexpected.

To address differences caused by floating point number computations, the invention estimates the error associated with the incremental maintenance procedure. For each variable V of the work area that is required to maintain the algebraic function, another variable VE is added to the work area that contains an estimate of the error in V. The variable VE estimates the error between the value of V and the full recomputation value of V. The functions that compute the error estimate variables VE are distributive and thus also incrementally maintainable. The error estimate variables are maintained incrementally as part of the work area. The estimated error in the algebraic function (versus the full recomputation value) is computed from the error estimate variables VE of the work area. When, for a given group (i.e., row) of the AST, the ratio of (1) the estimated error of the algebraic function to (2) the incrementally computed value of the algebraic function exceeds a threshold (for example, 0.1%), the invention applies the method of selective recomputation [5] to recompute the value of that group from the base table data. The method of selective recomputation is also applied to those groups that violate a boundary condition (e.g. a negative value for variance).

Notice that some algebraic functions use the same functions and compute the same values for their work areas. For example, regression family functions share the same work area (SUM(X), COUNT(X), SUM(Y), COUNT(Y), VAR(X), VAR(Y), COV(X,Y)). Hence, it is possible to share the work area among algebraic functions. The benefit of such sharing is reducing the space required to create the work areas and saving time to maintain the work areas.

Basically, there are different types of possible shares. First, an each exact match has two or more work area functions that are exactly the same. Second, a partial match has one work area function that is a subset of another. Third, an intersection has some overlapping between two work area functions, but they are not subset of each other. Such functions can share these work areas because they can be computed from the same work area.

To implement the invention in a relational database program, such as DB2, for each algebraic function, a work area column (of type Bit Data) which may contain multiple logical fields is created. Thus, the invention provides a work area approach for incremental algebraic AST maintenance, in particular, the association of a work area with each algebraic function. Then, the maintenance of the algebraic function turns to the maintenance of its corresponding work area.

With the invention, the association of a work area for each algebraic function makes the aggregate algebraic function incrementally maintainable. Also, the invention designs a framework in the query compilation phase for incremental maintenance of the algebraic functions in AST. The invention addresses precision errors of incremental maintenance by incrementally maintaining estimates of the errors. Also, the invention generalizes the solutions and framework to any algebraic functions, even user defined aggregates.

One benefit of the invention is performance. The invention permits incremental maintenance of ASTs with algebraic functions. Incremental maintenance is often much more efficient than full recomputation. ASTs are used to improve query performance.

While the invention has been described in terms of preferred embodiments, those skilled in the art will recognize that the invention can be practiced with modification within the spirit and scope of the appended claims.

What is claimed is:

1. A computer implemented method of incrementally maintaining an algebraic aggregate function in an automatic summary table (AST) of at least one relational database, said method comprising:

creating a first work area associated with an additional column for said algebraic aggregate function of said AST;

creating a second work area associated with variables and error estimate variables of distributive aggregate functions used to compute said algebraic aggregate function, wherein each said variable and each said error estimate variable corresponds to a row of said AST, wherein each said error estimate variable estimates an error between a value of said variable and a full recomputation value of said variable; and wherein said variables and said error estimate variables are incrementally maintainable;

upon receiving a query corresponding to said AST, populating and either inserting or deleting said variables and said error estimate variables within said second work area to provide an incrementally maintained variable and an incrementally maintained error estimate variable to said first work area;

when a ratio of an estimated error value of said algebraic aggregate function for a given row of said AST to said incrementally maintained error estimate value, corresponding to said given row, exceeds a threshold, then selectively recomputing a value for said variable, otherwise maintaining said incrementally maintained error estimate value of said variable; and reporting said algebraic aggregate function of said AST, based on either said recomputed value or said incrementally maintained error estimate value, in response to said query.

2. A program storage device readable by computer, embodying a program of instructions executable by the computer to perform a method of incrementally maintaining algebraic aggregate functions in automatic summary tables (ASTs) of at least one relational database, said method comprising:

creating a first work area associated with an additional column for said algebraic aggregate function of said AST;

creating a second work area associated with variables and error estimate variables of distributive aggregate functions used to compute said algebraic aggregate function, wherein each said variable and each said error estimate variable corresponds to a row of said AST, wherein each said error estimate variable estimates an error between a value of said variable and a full recomputation value of said variable; and wherein said variables and said error estimate variables are incrementally maintainable;

upon receiving a query corresponding to said AST, populating and either inserting or deleting said variables and said error estimate variables within said second work area to provide an incrementally maintained variable and an incrementally maintained error estimate variable to said first work area;

when a ratio of an estimated error value of said algebraic aggregate function for a given row of said AST to said incrementally maintained error estimate value, corresponding to said given row, exceeds a threshold, then selectively recomputing a value for said variable, otherwise maintaining said incrementally maintained error estimate value of said variable; and reporting said algebraic aggregate function of said AST, based on either said recomputed value or said incrementally maintained error estimate value, in response to said query.

* * * * *